(12) United States Patent
Tremblay et al.

(10) Patent No.: US 7,616,006 B2
(45) Date of Patent: Nov. 10, 2009

(54) METHOD AND SYSTEM FOR ELECTROLYZER DIAGNOSIS BASED ON CURVE FITTING ANALYSIS AND EFFICIENCY OPTIMIZATION

(75) Inventors: Gilles Tremblay, Montréal (CA); Said Berriah, Montréal (CA); Michel Veillette, St-Bruno de Montarville (CA)

(73) Assignee: Recherche 2000 Inc., Montreal, Quebec (CA)

( * ) Notice: Subject to any disclaimer, the term of this patent is extended or adjusted under 35 U.S.C. 154(b) by 215 days.

(21) Appl. No.: 11/454,669

(22) Filed: Jun. 16, 2006

(65) Prior Publication Data
US 2006/0289312 A1  Dec. 28, 2006

Related U.S. Application Data

(60) Provisional application No. 60/690,912, filed on Jun. 16, 2005.

(51) Int. Cl.
*G01R 31/08* (2006.01)
*G01R 31/28* (2006.01)
*G01N 27/26* (2006.01)

(52) U.S. Cl. ............ 324/522; 324/158.1; 204/400
(58) Field of Classification Search ............ 324/522, 324/158.1; 204/400
See application file for complete search history.

(56) References Cited

U.S. PATENT DOCUMENTS

| | | | |
|---|---|---|---|
| 4,774,456 A * | 9/1988 | Miller | 324/73.1 |
| 5,945,229 A * | 8/1999 | Meltser | 429/13 |
| 6,591,199 B2 * | 7/2003 | Tremblay et al. | 702/35 |

FOREIGN PATENT DOCUMENTS

| | | |
|---|---|---|
| DE | 102 17 694 A1 | 11/2003 |
| WO | WO01/78164 | 10/2001 |

OTHER PUBLICATIONS

"A Simple Procedure For Evaluating Membrane Electrolyzer Performance"; by K. L. Hardee, Oxytech Systems, Inc., 100 Seventh Ave., Chardon Ohio 44024, USA; pp. 234-242.
"Voltage-Current Curves: Application to Membrane Cells", by D. Bergner, M. Hartmann and H. Kirsch, Hoechst AG, FRG, pp. 159-169.

(Continued)

*Primary Examiner*—Amy He
(74) *Attorney, Agent, or Firm*—Ogilvy Renault, LLP

(57) ABSTRACT

The present invention provides a method and system for electrolyzer diagnosis based on curve fitting analysis and efficiency optimization. The present invention relates to monitoring the electrochemical cell components by using curve fitting and estimating the overall electrolyzer performance by using predictive models. The system according to the present invention includes an extraction unit for selecting suitable operation zones, a filtering unit, a curve fitting unit performing linear or non-linear regression by using user-defined equations applied to current-voltage data points and a curve fitting goodness analysis unit. The zones are defined as start-up zones, shutdown zones and load change zones. The system further includes a curve fitting parameters characterization unit for classifying curve fitting parameters by respect to the electrolyzer cells components technology and reference values, and a characterization database for storing fitting coefficients and their characterization.

7 Claims, 8 Drawing Sheets

OTHER PUBLICATIONS

"Factors Which Influence The Permselectivity Of High Performance Chlor-Alkali Membranes"; by Howard L. Yeager and Adam A. Gronowski, Department of Chemistry, The University of Calgary, Calgary, Alberta, Canada, T2N 1N4; pp. 81-91.

International Search Report dated Oct. 11, 2006 from the International Application No. PCT/CA2006/000986.

Motulsky, D. Harvey, "The GraphPad Guide to Nonlinear Regression", GraphPad Software Inc., San Diego, CA, 1995-96.

Suares et al., "Parameter estimation of a proton-exchange membrane fuel cell using voltage current data", Chemical Engineering Science, 55 (2000), 2237-2247.

* cited by examiner

METHOD AND SYSTEM FOR ELECTROLYZER DIAGNOSIS BASED ON CURVE FITTING ANALYSIS AND EFFICIENCY OPTIMIZATION

FIELD OF INVENTION

The present invention relates to a method and system to characterize an electrolyser performance composed with elementary electrochemical cells used in an industrial scale process (Chlor-Alkali, Chlorate production plants and Fuel cells). More particularly, it relates to monitoring the electrochemical cell components by using curve fitting and estimating the overall electrolyzer performance by using predictive models.

BACKGROUND OF THE INVENTION

An electrolyzer is defined as an apparatus where an electrolysis reaction takes place. Electrolysis is the process of decomposing a chemical compound into its elements or producing a new compound by the action of an electrical current. Basically, an electrolyzer is composed of two electrodes and a separator called a membrane. In the Chlor-alkali industry, primary products of electrolysis are chlorine, hydrogen, and sodium hydroxide solution (commonly called "caustic soda" or simply "caustic"). Three main electrolysis processes are used in the Chlor-Alkali industry: membrane, diaphragm and mercury. Because of the growing environmental concerns the latter processes are being replaced the membrane electrolysis process. In the chlorate industry, sodium chlorate or sodium hypochlorite is produced from the electrogenerated chlorine and caustic with no separator in the electrolysis cell. Fuel cells where water is electrolysed to produce hydrogen are also in the background of the present invention.

FIG. 1 identified as Prior Art is a schematic representation of a typical membrane cell used in the Chlor-alkali industry. It is composed of two compartments. The anode compartment is fed-up with a saturated brine solution (NaCl) while a dilute caustic soda passes through the cathode compartment. In the chlor-alkali plants, chlorine is generated at the coated (usually Ti) anode 2. The combination of hydroxide ions with migrated sodium ions across the selective membrane 1 generates caustic soda (NaOH) and Hydrogen gas. The cathode 3 is usually nickel with a catalytic coating to reduce the overpotential for H2 evolution. The complete chlor-alkali process is described by the following equation:

$$2NaCl + 2H_2O \rightarrow Cl_2 + H_2 + 2NaOH$$

Commonly in the recent chlor-alkali production plants, an electrolyzer is defined as a combination of elementary membrane cells. The electrolysis process takes place in each cell after applying a current. Therefore, the electrolyzer energy consumption plays a key role in the process. The electrolyzer overall performance is mainly related to each cell efficiency. It is well known in the art ("A First course in Electrode Processes", Derek Pletcher, "Ion Permeable Membranes", Thomas A. Davis, J. David Genders, Derek Pletcher), that voltage variations in the membrane cell are generally a result of physical changes within the cell components. The cell voltage variation is distributed between its components: anode, cathode, membrane and electrical connections. An abnormal decrease or increase in the cell voltage is generally considered as a premise to potential problems.

Known in the art is the article entitled "A Simple Procedure for Evaluating Membrane electrolyzer Performance" by K. L. Hardee in Modern Chlor-Alkali Technology V.6 pp. 234 1995. The author proposes to use curve-fitting coefficients to diagnose an elementary cell. This publication's focus was on the extraction of the fitting coefficients and their use to characterize the cell parts. However, it doesn't cover the aspect of the coefficients quality and the automation process for an electrolyzer composed of large number of membrane cells. The voltage and current data collected from operating plants are not always suited enough for the curve fitting procedure. Therefore, one aspect of the present invention is to propose analytical methods for the extraction of good curve fitting coefficients and a procedure for the classification of those parameters.

In accordance with above mentioned work and other known publications ("Voltag-Current curves: Application to membrane cells", D. Berger, M. Hartmann and H. Kirsch, Modern Chlor-Alkali Technology Vol. 4, Chap. 15) each elementary cell voltage can be approximated by an equation of the form:

$$U_{cell} = U_0 + S \times \log(I) + R \times I \qquad \text{Equation 1}$$

Thus after assuming that the electrodes follow a Tafel behaviour, i.e. are not mass transport limited, and that the other voltages are due to ohmic resistances, we could detail each term as follow:

$$U_0 = A_a + A_c + E_a + E_c$$

$$R = R_e + R_s + R_b$$

$$S = B_a + B_c$$

Where:

$B_a$: The anode Tafel slope $A_a$: Anode Log of the exchange current density $E_a$ Anode Equilibrium Potential $B_c$: The anode Tafel slope $A_c$: Anode Log of the exchange current density $E_c$: Anode Equilibrium Potential $R_e$: Electrolyte resistance $R_m$: Membrane resistance $R_s$: Structure/contact resistance I: Current density The $(S,R,U_0)$ coefficients evaluation method proposed within the present invention will give ultimately a clear idea on which part of the cell is failing: membrane (R), electrodes (S,U0), electrolyte or the cell structure (R).

Schetter Thomas in patent application DE10217694 describes a method for dynamic determination of the voltage-current characteristic curve of a fuel cell during operation under different loading conditions. Although this document addresses the problem of extracting voltage-current linear curve parameters, it doesn't bring a useful method for analyzing these parameters in an industrial scale and relate them to cell performance.

In industrial electrolysis processes, a non-negligible consideration is given to the energy consumption, which is directly related to the cell performance and to the process current efficiency. The most important issues that affect the cell performance are: the current efficiency of the two products (Cl2, NaOH), their purity, the membrane resistance and its lifetime and finally the electrodes' activity (coating). While the membrane resistance and electrodes' activity could be characterized and evaluated by the curve-fitting method

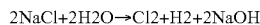

described in the present invention, the products current efficiency diagnosis and optimization is a more complex issue.

It is well known in the art ("A First course in Electrode Processes", Derek Pletcher) that the energy consumption is proportional to current efficiency as following:

$$\text{Energy consumption} = \frac{n \times F \times E_{cell}}{3.6 \times 10^3 \times \phi \times M} \quad \text{Equation 2}$$

where
n: Number of cells in the electrolyser
F: Faraday constant
$E_{cell}$: Cell Voltage
$\phi$: Fractional current efficiency
M: Molecular weight of the product in kg.

According to known studies, a major reason for the loss in the current efficiency is the back-migration of hydroxide ions through the cation exchange membrane from the catholyte to the anolythe and also the membrane conductivity. The hydroxide ions back-migration is mainly due to the sodium hydroxide (NaOH) strength. The increase in the membrane conductivity results from a change in the electrolyte temperature.

Howard L. Yeager and Adam A. Gronowski in "Factors which influence the Permselectivity of High Performance Chlor-Alkali Membranes" outline the influence of sodium hydroxide concentration on the current efficiency for a laboratory Nafion™ bilayer membrane cell. This study sets forth a theoretical complex relationship between the two parameters. Thomas A. Davis, J. David Genders, Derek Pletcher in "Ion Permeable Membranes" also indicate a relationship between the membrane conductivity, the brine impurities and the current efficiency for a Nafion™ membrane cell.

All the aforementioned studies were done in a laboratory-controlled environment where it is easy to extract the current-voltage curve characteristic, while in a real operation plant the measurements are often not reliable due to control problems. Thus, the aim of one aspect of the present invention is the online generation of relationship between current efficiency and operational measurements such as the sodium hydroxide and catholyte temperature.

SUMMARY OF THE INVENTION

One aspect of the present invention concerns a method for the characterization of each elementary cell by using analytical coefficients extracted from the application of curve fitting to current-voltage data, measured periodically and stored in a database. The generated analytical parameters are used as indicators to spotlight which part of the cell is the source of operation failing or loss of performance. Within the scope of the present invention a cell is highlighted as abnormal or failing throw comparing its characterization parameters with a reference cell or a known aging standards.

A further aspect of this invention is related to the forecasting of the electrolyzer efficiency in an electrolysis process by using data-driven models based on the learning of the relationship between operational parameters and the calculated efficiency.

In accordance with a broad aspect of the invention, there is provided a method for monitoring at least one electrolyser element performance from a group of electrolyser elements, the method comprising: measuring relevant electrolyser element parameters from each of the at least one electrolyser element and storing measurements in a historical database: selecting at least one suitable operation zone from each of the at least one electrolyser element for a curve-fitting analysis: identifying at least one reference element from the group of electrolyser elements, the reference element being a new or well performing element compared to other elements in the group: characterizing each of the at least one electrolyser element by fitting a current-voltage curve using the at least one suitable operation zone and the measurement parameters in the historical database, thereby generating at least one characterization: comparing each of the at least one characterization to the at least one reference element: and determining that each one of the at least one electrolyser element that deviates from the at least one reference element beyond a given threshold is prematurely aging.

DETAILED DESCRIPTION OF THE PREFERRED EMBODIMENT

It is a principal object of this invention to provide a system for monitoring, characterizing and optimizing electrolyzer performance. Typically in the chlor-alkali industry, an electrolyzer is defined as a combination of elementary electrochemical cells. An elementary cell is defined as the smallest group of anodes and cathodes that are connected to the same current feeder and separated by a membrane. The way the anodes, cathodes and membrane are connected differ according to the used technology. According to present invention, the diagnosed electrolyzers are used in Chlor-alkali, Chlorate plants. Different aspects of the present invention could also be applied to fuel cells.

Figure 1:
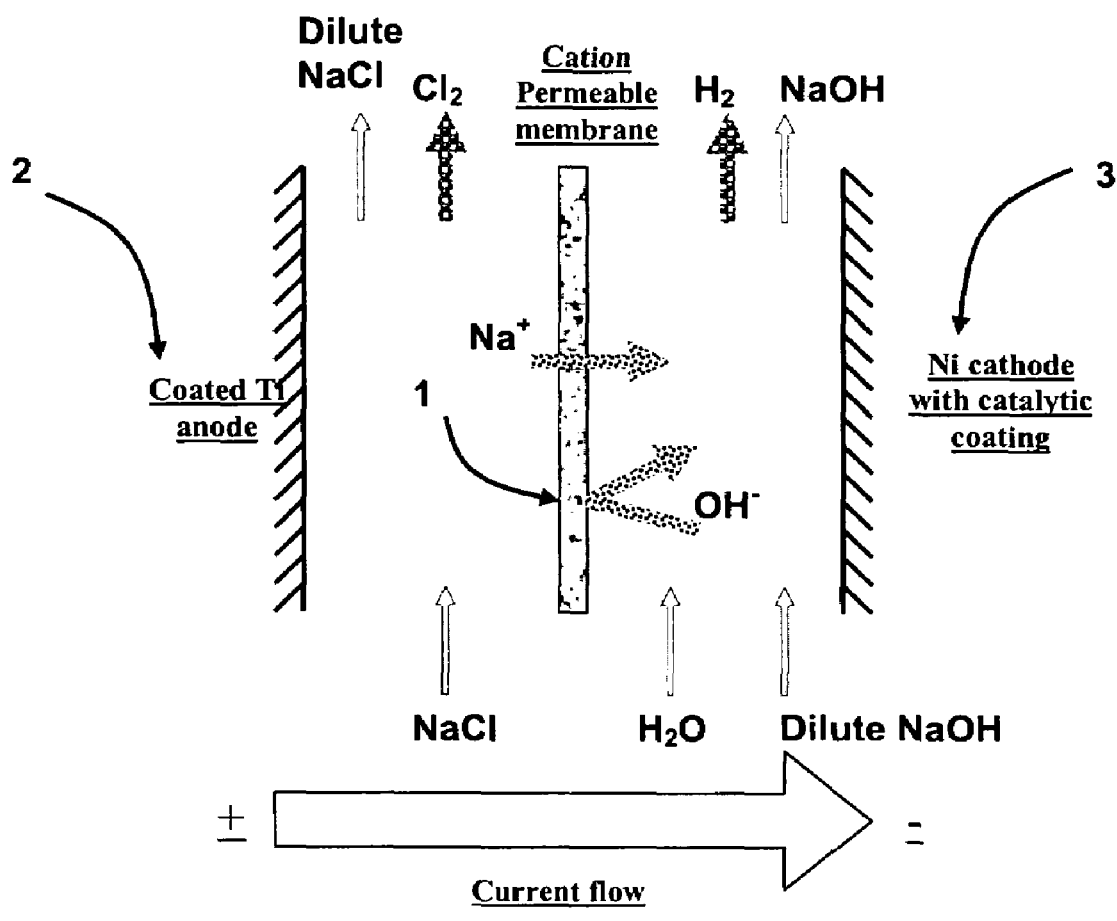
FIG. 1 (Prior art) represents a typical diagram of a membrane cell used in the Chlor-Alkali process.
Figure 2:
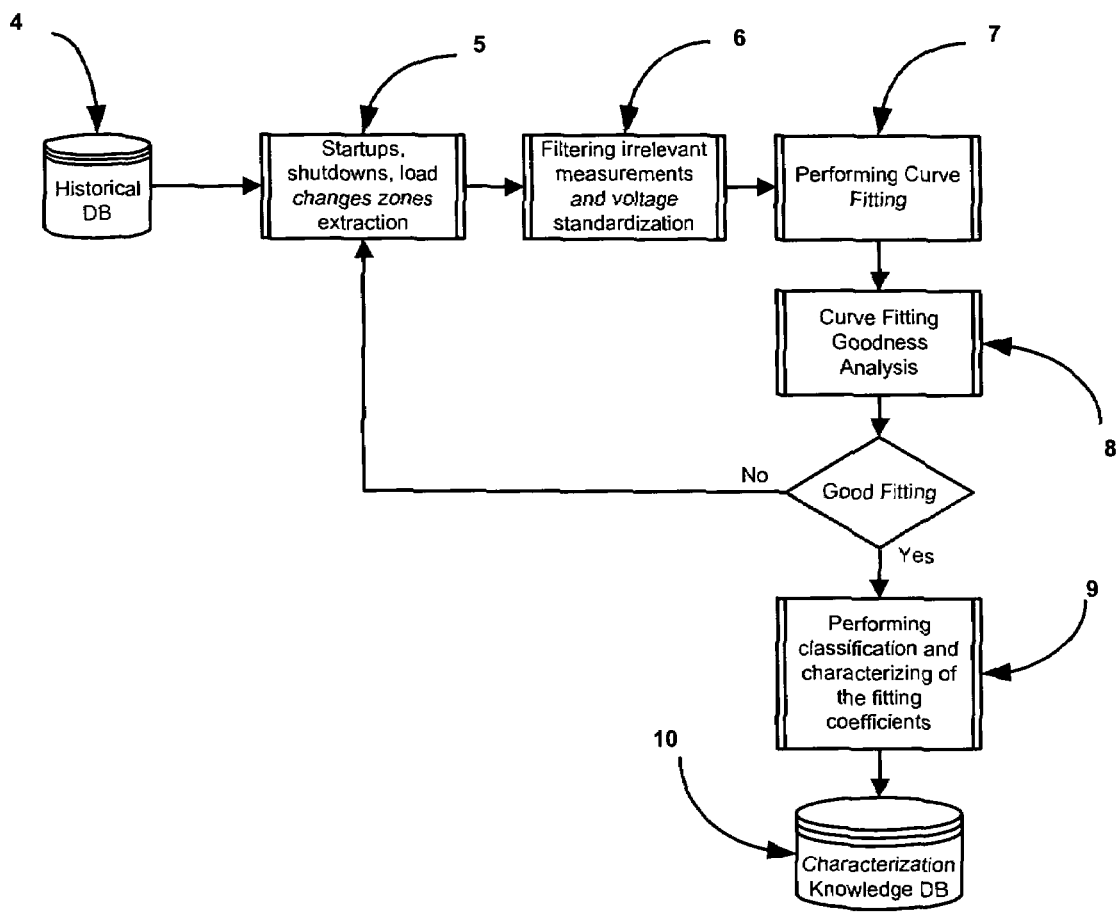
FIG. 2 shows the structure of the elementary membrane cell analysis by diagnosing fitting coefficients.
Figure 3:
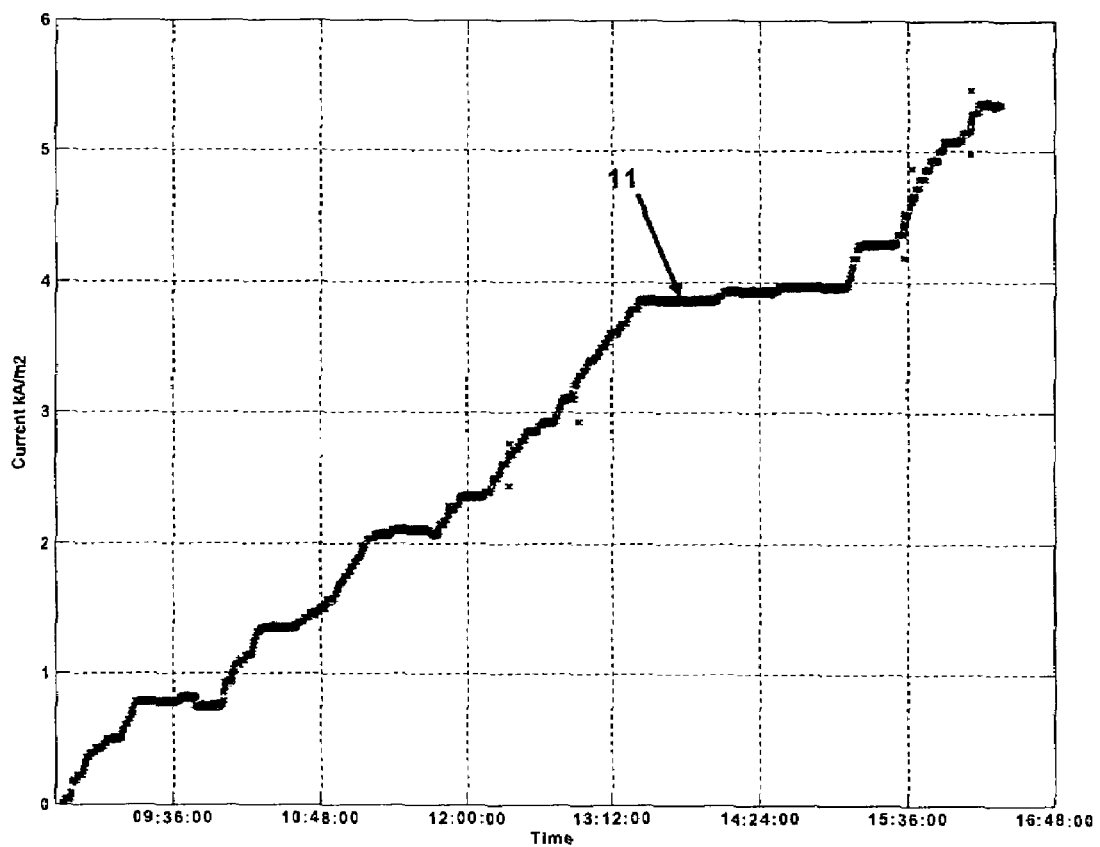
FIG. 3 is a typical start-up zone in an electrolyzer current.
Figure 4:
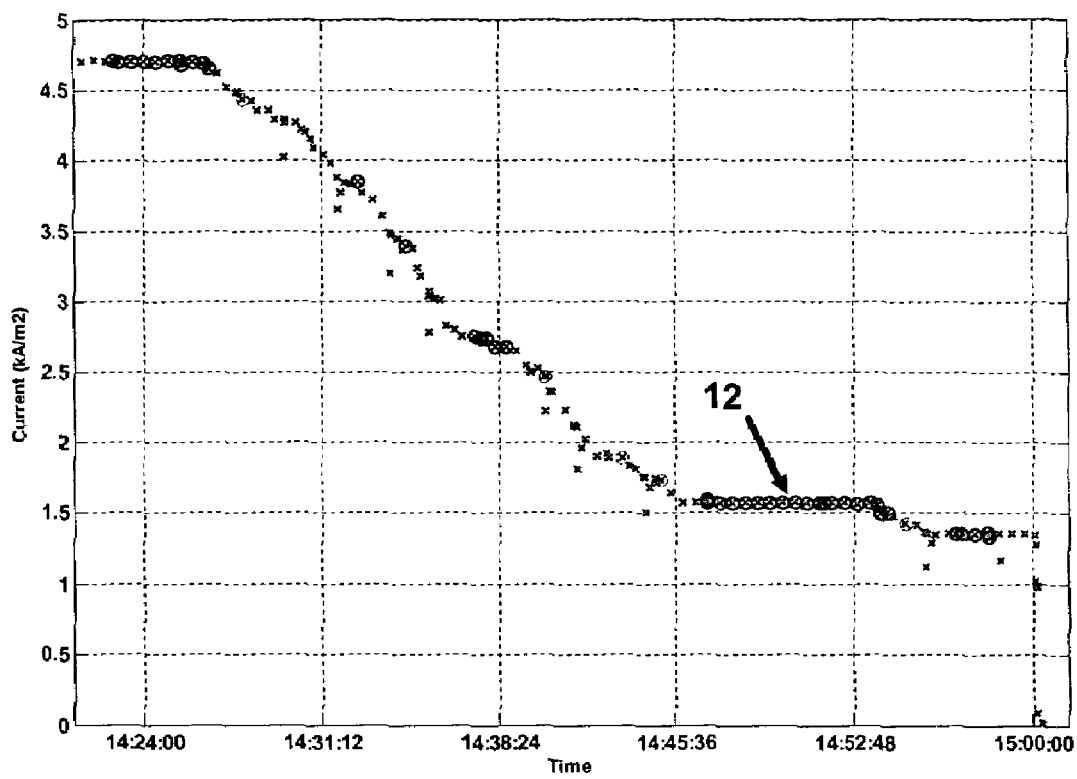
FIG. 4 is a typical shut down zone in an electrolyzer current.
Figure 5:
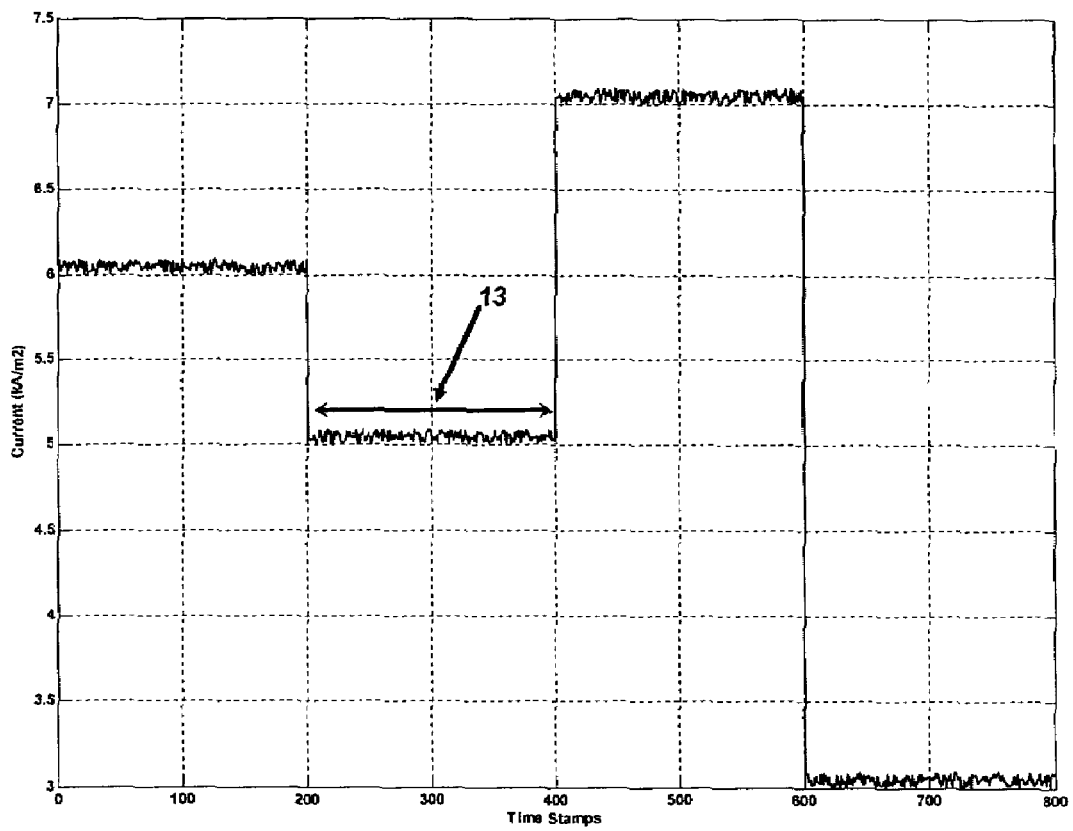
FIG. 5 is a typical load change zone in an electrolyzer.

FIG. 2 illustrates the flow chart diagram for the characterization methodology based on curve fitting coefficients analysis addressed in the principal aspect of this invention. Historical Database unit 4 stores sufficient number of chronological data to characterize elementary membrane cells and electrolyzers. According to a preferred embodiment, the cell voltage and the current are measured through the system outlined in U.S. Pat. No. 6,591,199 to Recherche 2000 inc. Other relevant parameters measured by the plant sensors are imported into the database by using a communications protocol within the aforementioned platform. Due to storing and communication considerations, voltage, current and external parameters aren't acquired with the same time stamp. Therefore, the Extraction unit 5 synchronizes the data values from the different parameters to the same time stamp. Within the preferred embodiment, the synchronization is performed by interpolating the missed data points through a piecewise linear interpolation. Other well-known techniques such as zeroholder filters, zero padding, spline interpolation, etc., might be used. In addition to the synchronization, the Extraction unit 5 selects suitable operation zones for the curve fitting analysis. Three types of cell operation zones are concerned with the method depicted in FIG. 2: start-up zones, shutdown zones and load change zones. Basically, the current defined all the suitable operation zones. An example of a start-up zone is depicted in FIG. 3. Typically, in a start-up zone, electrolyzer current rises from low values to high values through stable steps. On the contrary, a shut down zone is represented by a fall in the current values from high to low by stable steps as illustrated in FIG. 4. In addition to the start-ups and shutdowns, a sequence of load change is also suitable for cell characterization by curve fitting analysis as illustrated in FIG. 5. With respect to the present invention, data extraction in unit 5 is performed manually by the means of a user graphical interface or automatically by several analytical methods. One of the said methods performs the extraction of stable zones 11 12 13 from a driving parameter such as the electrolyzer current. According to that method, stable zones are detected through scanning the driving parameter and appointing those that represent a statistical normal distribution with a slope close to zero. Another method performs similar stable zones extraction by spotlighting data sequences within the driving parameter variance range predefined by the user.

Unit 6 filters voltage, current and external values from irrelevant data points. Ill-conditioned values are mainly missed or out-of-range data points resulting from drifting or disconnected sensors. The filtering in Unit 6 is performed by the mean of smoothing techniques in the time domain of signal processing techniques in frequency domain (windowing, wavelets etc). According to a preferred embodiment of the present invention unit 6 also performs voltage standardization. This latter represents compensation to voltage variation due to operational parameters such as catholyte temperature and sodium hydroxide concentration. Usually, voltage standardization to operational parameters is performed by linear equations such as the following:

$$U_{normalized} = U_{raw} + F_{temp}(Temp - ref_{temp}) \times \left(\frac{I_{measured}}{\text{surface}}\right) + F_{conc}(Conc - ref_{conc}) \times \left(\frac{I_{measured}}{\text{surface}}\right)$$

$U_{raw}$: Elementary measured voltage.
$F_{temp}$: Compensation factor for the catholyte temperature.
Temp.: Catholyte temperature.
$ref_{temp}$: Temperature reference.
$I_{measured}$: Raw measured load.
Surface: Membrane Surface.
Conc.: Sodium Hydroxide concentration.
$F_{conc}$: Compensation factor for caustic concentration.
$ref_{conc}$: Reference for the caustic.

Other linear or nonlinear compensations are used according to the plants and the technology. Notice that the effect of the standardization mentioned above is neglected at low load values.

After the filtering and standardization task is finished, the unit 7 performs the curve fitting operation on the selected current-voltage values for each elementary cell. The curve fitting is done through the application of a non-linear least square procedure on Equation 1. According a preferred embodiment, the non-linear least square could be applied to the current-voltage selected points or any tendency measure (mean, median etc.) on each stable zone.

As mentioned above and with respect to the present invention, the extraction of the fitting coefficients $(S, R, U_0)$ uses the method of least squares when fitting the data. To obtain the desired coefficients, least squares method minimizes the summed square of residuals. The residual for the ith current-voltage data point ri is defined as the difference between the raw values Vi and the fitted values $\hat{V}_i$, and is identified as the error associated with the data.

$$r_i = V_i - \hat{V}_i$$

Residual=data−fit

The sum squares of residuals is given by $$SSE = \sum_{i=1}^{n} r_i^2 = \sum_{i=1}^{n} (V_i - \hat{V}_i)^2$$

Where n is the number of data points included in the fit and SSE is the sum of squares error estimate.

Nonlinear models are more difficult to fit than linear models because the coefficients cannot be estimated using simple matrix techniques. Instead, an iterative approach is performed in Unit 7 that follows these steps:

1- Start with an initial estimate for each coefficient. A heuristic approach is provided that produces reasonable starting values.

2- Produce the fitted curve for the current set of coefficients; this involves the calculation of the Jacobian of V, which is defined as a matrix of partial derivatives taken with respect to the coefficients.

3- Adjust the coefficients and determine whether the fit improves. The direction and magnitude of the adjustment depend on the fitting algorithm. For the purpose of the present invention, a Levenberg-Marquardt regression algorithm is used to perform the adjustment. This algorithm has been used for many years and has proved to work most of the time for a wide range of nonlinear models and starting values. For details on that algorithm, refer to Levenberg, K., "A Method for the Solution of Certain Problems in Least Squares," Quart. Appl. Math, Vol. 2, pp. 164-168, 1944 and Marquardt, D., "An Algorithm for Least Squares Estimation of Nonlinear Parameters," SIAM J. Appl. Math, Vol. 11, pp. 431-441, 1963. Other well-known algorithms such us Trust-Region algorithm or Gauss-Newton algorithm are also well suited to perform the same adjustment.

4- Iterate the process by returning to step 2 until the fit reaches the specified convergence criteria.

While using other fitting procedures as the Nonlinear Robust Fitting or The Weighting Nonlinear Fitting the process steps described above should be modified accordingly.

One of the main aspects of the present invention is the fitting coefficients quality or goodness analysis. Clearly, extracting good $(S, R, U_0)$ coefficients enhances the analysis reproducibility and furthermore provides a precise monitoring of the cell parts. Unit 8 focuses on the fitting goodness analysis. Many standard indicators might be used as evaluators of the fitting goodness. Unit 8 supports two fitting statistics: R-square and confidence bounds. The former one measures how successful the fit is in explaining the variation of the data. In other words, R-square is the square of the correlation between the real values and the predicted values. It is also called the square of the multiple correlation coefficient and the coefficient of multiple determination. Formally, R-square is defined as the ratio of the sum of squares of the regression (SSR) and the total sum of squares (SST). SSR is defined as:

$$SSR = \sum_{i=1}^{n}(\hat{V}_i - \overline{V})^2$$

SST is also called the sum of squares about the mean, and is defined as:

$$SST = \sum_{i=1}^{n}(V_i - \overline{V})^2$$

where SST=SSR+SSE. Given these definitions, R-square is expressed as $$R^2 = \frac{SSR}{SST} = 1 - \frac{SSE}{SST}$$

R-square can take any value between 0 and 1, with a value closer to 1 indicating a better fit. For example, an R2 value of 0.8234 means that the fit explains 82.34% of the total variation in the data about the average. According to a preferred embodiment of the present invention, all the triplets that were generated with an R2 less than 0.99 are not taken in account for the next step of the process.

Figure 6:
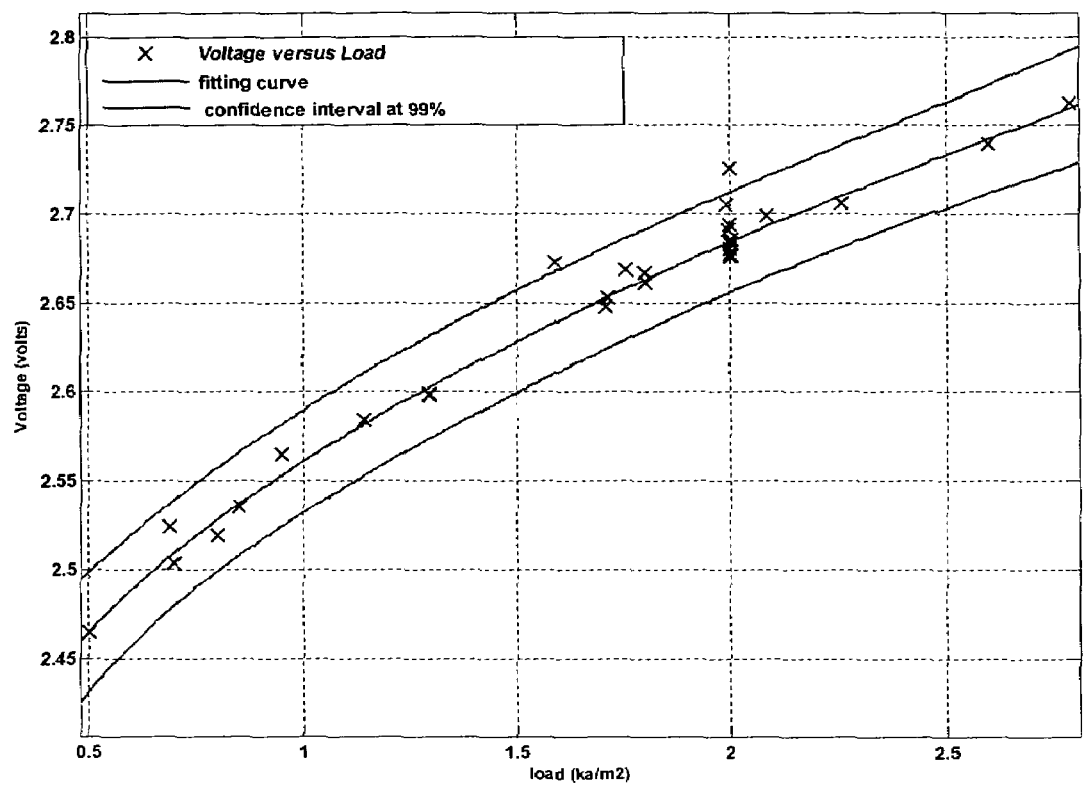
FIG. 6 illustrates a nonlinear curve fitting with statistics (confidence bounds).

Unit 8 calculates confidence bounds for the fitting triplet. Confidence bounds define the lower and upper values of the associated coefficient, and define the width of the interval. This width of interval indicates uncertainty about the fitted coefficients, the predicted observation, or the predicted fit. For example, a very wide interval for the fitted coefficients indicates that we should use more data when fitting before we can say anything very definite about the coefficients. The bounds are defined with a level of certainty that is specified. The level of certainty is often 95%, but it can be any value such as 90%, 99%, 99.9%, and so on. For example, we might want to take a 5% chance of being incorrect about predicting a new observation. Therefore, we would calculate a 95% prediction interval. This interval indicates that we have a 95% chance that the new observation is actually contained within the lower and upper prediction bounds. FIG. 6 depicts an example of confidence bounds for a nonlinear curve fitting of Equation 1.

Notice that good fit statistics doesn't necessarily mean that the generated triplets are relevant for cell characterizing. In fact, if the filtering process in unit 6 is not well performed, good fitting statistics for ill-conditioned data point values might be obtained.

Fitting coefficients with good confidence are used as a reference to the final characterization operation.

Figure 7:
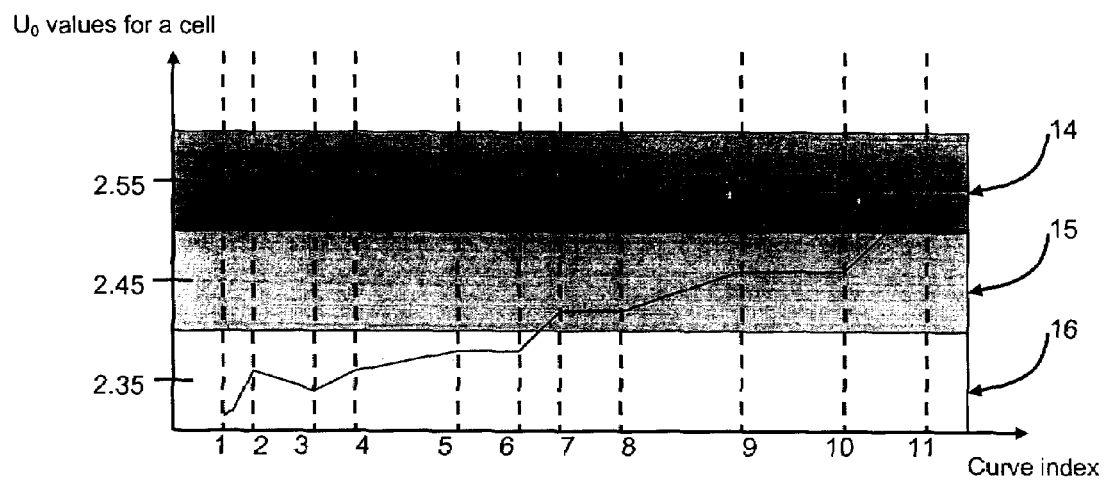
FIG. 7 shows an example of classifying fitting coefficients based on operation ranges.
Figure 8:
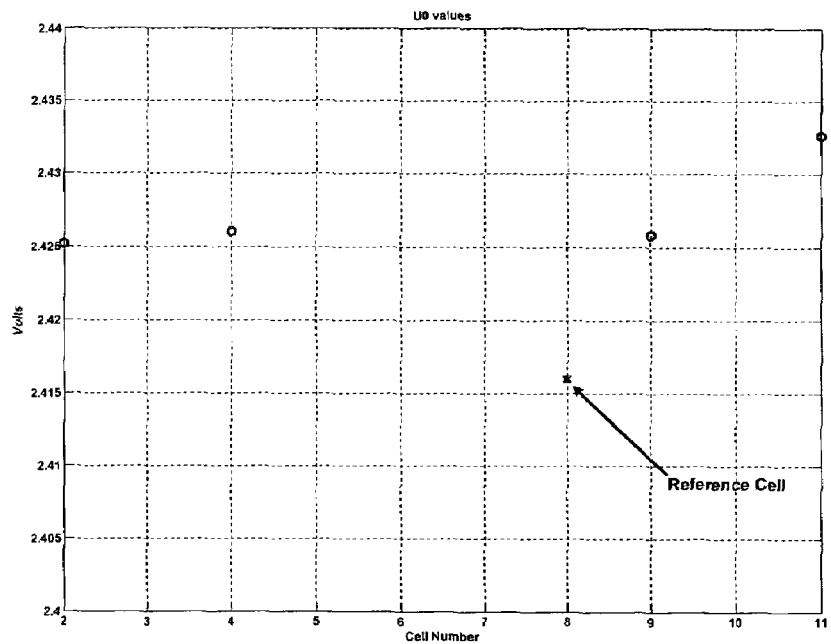
FIG. 8 is a flow diagram for the electrolyzer efficiency optimization procedure

Unit 9 applies a classification or grouping procedure on each generated fitting parameters for the elementary cell. The aim of the grouping process is to devise the range of each fitting coefficients into classes of operation. The move of a fitting parameter from one class to another is an indicator of potential premature aging or loss of performance. Coefficients membership to operation classes could also be analyzed with respect to the elementary cell components (membrane, anode and cathode). According to a preferred embodiment, the classification procedure is applied on a coefficient reference range defined by the plant expert or whether based on an operation zone defined as a reference. A reference coefficient is extracted from a cell called "Reference Cell", this latter is known as new or good performing cell compared to the others with the same or equivalent components. As an example, FIG. 7 illustrates the evolution of the coefficient U0 for an elementary cell where 3 operation classes were defined: class 1 "new coating" 16, class 2 "old coating" 15, class 3 "No coating" 14. Furthermore, the U0 drift from class 1 to class 3 clearly indicates that this cell is losing its electrodes coating. Another example is illustrated by FIG. 8 where we can deduce the behaviour of the cell in the electrolyser by comparing their U0 values to those of cell 8 (reference cell).

One way of performing the classification procedure is to use the fuzzy C means clustering algorithm. According to this algorithm the user must define the desired number of groups in the reference fitting coefficient range, then the membership degree of new presented values is defined with respect to the predefined reference groups.

Another way to perform the characterization parameters monitoring is to track their deviation against a predefined aging model (related to the cell components technology).

Finally, reference coefficients, operation classes and according prevention actions are stored in the Characterization Knowledge Base Unit 10. It acts as a high-level diagnosis engine for online analysis and long-term cell characterization based on the fitting coefficients.

Figure 9:
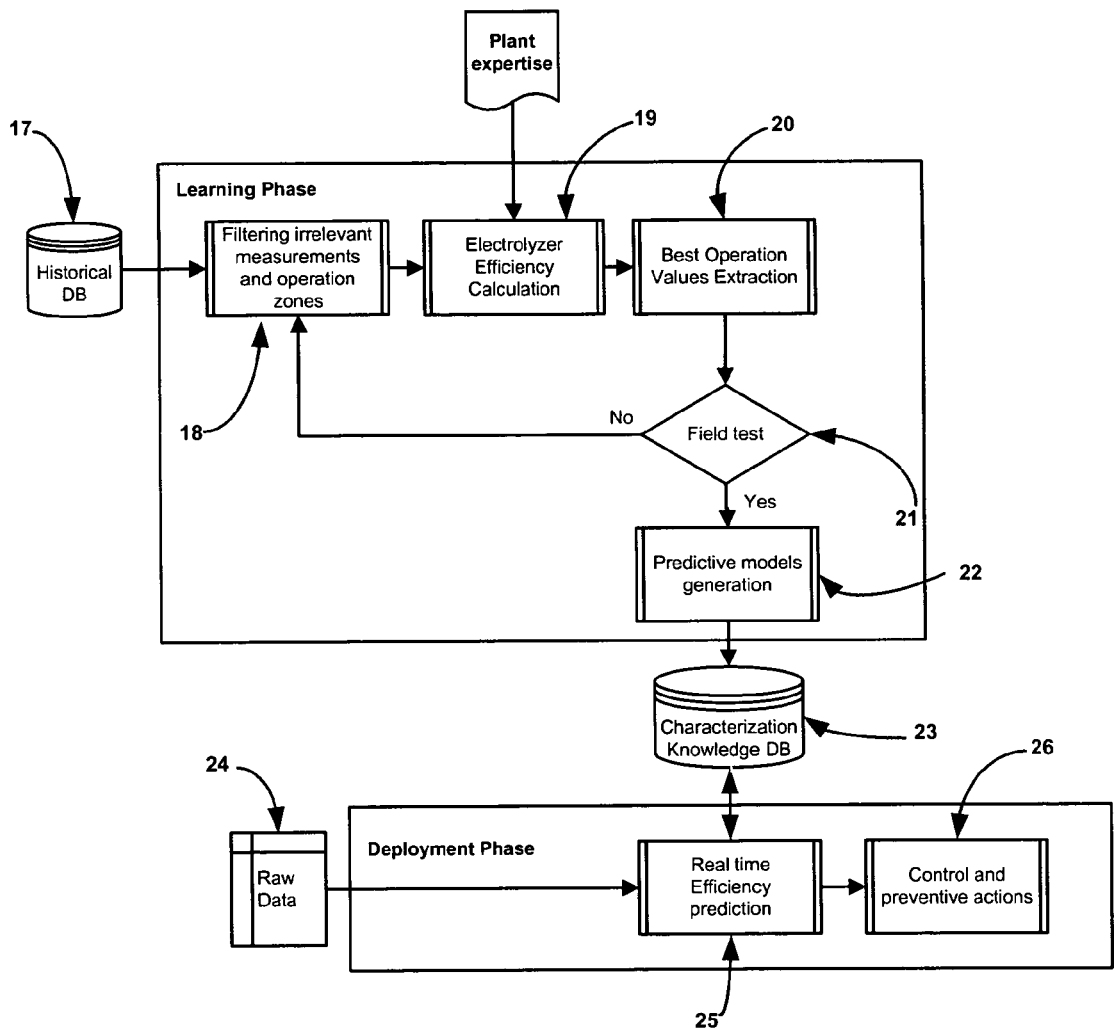
FIG. 9 is a flow diagram for the electrolyzer efficiency optimization procedure

FIG. 9 describes another aspect of the present invention. The flow chart diagram illustrates the methodology for the electrolyzer overall performance evaluation and diagnosis based on its efficiency. The diagnosis process is made by means of two phases: learning phase and deployment phase. According to a preferred embodiment, in the learning phase, the acquired data from the electrolyzer are stored in a historical database Unit 17. Two categories of data are imported from the database, real time recording such as cell voltage, current, flows etc. and punctual measurements such as electrolyzer inlet and outlet pH, impurities deposits etc. Since this aspect of the invention concerns the electrolyzer performance at high efficiency, the analysis process is performed only on steady state operation zones. Unit 18 selects from the steady state operation zones based on a driving parameter like the electrolyzer current. It also filters the ill-conditioned data points due to the shutdowns, disconnected or drifted sensors. Since the data came from different sources with several acquisition time stamps, Unit 18 performs also the synchronization process, which generates data series with the same time stamp.

Based on the plant expertise, Unit 19 calculates the current or production efficiency for the electrolyzer. Production or current efficiency calculation depends on used cell technology, products generated and control objectives. As an example, for chlor-alkali plants the efficiency could be calculated for one or two products (cathode or anode part). Formally, the efficiency is defined as the ratio of the produced species by the theoretical production (based on the current consumption). While the mass balance plays a key role in the efficiency calculation it is important to filter the ill conditioned measurements through unit 18. According to a preferred embodiment, unit 20 generates operation parameters values (Caustic soda outlet concentration, catholyte temperature as an example) that maximize the obtained current efficiency values with unit 18 on a relatively little time period (days or weeks). The generated then operation values are tested on the field plant 21 for the validation purpose. If the obtained performance is judged sufficient, the values will be used as reference to generate the forecasting model with unit 22. Predictive models relate the maximum efficiency values to the operation parameters by using parametric or non-parametric modeling techniques such as neural networks. Finally the generated models and preprocessing actions are stored in the Characterization Knowledgebase unit 23. In the deployment phase, electrolyzer efficiency is predicted by applying reference model 25 to the acquired and processed raw data 24. Based on that prediction, preventive control actions (adjusting setups, thresholds etc.) are better planned.

What is claimed is:

1. A method for monitoring at least one electrolyser element performance from a group of electrolyser elements, the method comprising:
   measuring relevant electrolyser element parameters for each of said at least one electrolyser element and storing measurements in a historical database;
   selecting at least one suitable operation zone for each of said at least one electrolyser element for a curve-fitting analysis;
   identifying at least one reference element from said group of electrolyser elements, said reference element being a new or well performing element compared to other elements in said group;
   characterizing each of said at least one electrolyser element by fitting a current-voltage curve using said at least one suitable operation zone and said measurement parameters in said historical database, thereby generating at least one characterization;
   comparing each of said at least one characterization to said at least one reference element; and
   determining that each one of said at least one electrolyser element that deviates from said at least one reference element beyond a given threshold is prematurely aging.

2. The method according to claim 1, wherein said at least one electrolyser includes any electrochemical cells used in an industrial scale.

3. The method according to claim 1, wherein said curve fitting performs least square linear or non-linear regression of the current-voltage curve extracted from startup, shutdowns or load change operation modes.

4. The method according to claim 1, wherein curve-fitting coefficients values are monitored over time and compared to said at least one reference element.

5. The method according to claim 1, wherein curve-fitting coefficients trend deviation from said at least one reference element draws a conclusion about the electrolyser operation performance.

6. The method according to claim 1, further comprising performing a real time efficiency prediction of said at least one electrolyser element performance using said at least one characterization.

7. The method according to claim 1, further comprising performing a curve-fitting goodness analysis to evaluate the curve-fitting, and rejecting a curve-fitting that does not meet a predetermined threshold.

* * * * *